(12) United States Patent
Friedli

(10) Patent No.: US 11,612,262 B2
(45) Date of Patent: Mar. 28, 2023

(54) ASSISTANCE SYSTEM FOR THE DELIVERY OF MAIL CONSIGNMENTS

(71) Applicant: INVENTIO AG, Hergiswil (CH)

(72) Inventor: Paul Friedli, Remetschwil (CH)

(73) Assignee: INVENTIO AG, Hergiswil (CH)

( * ) Notice: Subject to any disclaimer, the term of this patent is extended or adjusted under 35 U.S.C. 154(b) by 1003 days.

(21) Appl. No.: 16/338,176

(22) PCT Filed: Sep. 27, 2017

(86) PCT No.: PCT/EP2017/074537
§ 371 (c)(1),
(2) Date: Mar. 29, 2019

(87) PCT Pub. No.: WO2018/060274
PCT Pub. Date: Apr. 5, 2018

(65) Prior Publication Data
US 2020/0022520 A1    Jan. 23, 2020

(30) Foreign Application Priority Data

Sep. 30, 2016    (EP) .................................... 16191702

(51) Int. Cl.
*A47G 29/14*   (2006.01)
*G07C 9/38*    (2020.01)
(Continued)

(52) U.S. Cl.
CPC ........ *A47G 29/141* (2013.01); *E05B 47/0001* (2013.01); *E05B 65/52* (2013.01);
(Continued)

(58) Field of Classification Search
CPC ............ A47G 29/141; A47G 2029/145; A47G 2029/149; G07C 9/38; E05B 47/0001;
(Continued)

(56) References Cited

U.S. PATENT DOCUMENTS

2003/0023870 A1   1/2003   Geros
2003/0154891 A1   8/2003   Fassbender et al.
(Continued)

FOREIGN PATENT DOCUMENTS

CN   102968826 A   3/2013
CN   103869785 A   6/2014
(Continued)

*Primary Examiner* — Nabil H Syed
(74) *Attorney, Agent, or Firm* — Wiggin and Dana LLP

(57) ABSTRACT

A mail delivery assistance system comprises a letterbox for receiving mail consignments that has an opening and an electronic locking mechanism, a data processing device that comprises a database having an address file in which a respective addressee is associated with a building address, and a reader for capturing mail consignment data of a mail consignment. The reader, during operation, is communicatively connected to the data processing device in order to send the mail consignment data to the data processing device. The data processing device checks whether the mail consignment data match an addressee in the address file, and, if this is the case, generates a control signal for the locking mechanism in order to open the opening and to allow delivery of the mail consignment.

24 Claims, 6 Drawing Sheets

(51) Int. Cl.
    *E05B 47/00*     (2006.01)
    *E05B 65/52*     (2006.01)
    *G06K 7/10*     (2006.01)
    *G06K 7/14*     (2006.01)

(52) U.S. Cl.
    CPC ....... *G06K 7/10366* (2013.01); *G06K 7/1413* (2013.01); *G07C 9/38* (2020.01); *A47G 2029/145* (2013.01); *A47G 2029/149* (2013.01); *E05B 2047/0073* (2013.01)

(58) Field of Classification Search
    CPC ... E05B 65/52; G06K 7/10366; G06K 7/1413
    See application file for complete search history.

(56) References Cited

U.S. PATENT DOCUMENTS

| | | | |
|---|---|---|---|
| 2005/0075988 A1 | 4/2005 | Cordery et al. | |
| 2016/0275741 A1 | 9/2016 | Carstens et al. | |
| 2017/0326598 A1* | 11/2017 | Chelian | A47G 29/16 |
| 2018/0070753 A1* | 3/2018 | Eveloff | H04W 4/025 |
| 2019/0197649 A1* | 6/2019 | Jones | G06Q 20/3223 |

FOREIGN PATENT DOCUMENTS

| | | | | |
|---|---|---|---|---|
| CN | 104348911 A | 2/2015 | | |
| CN | 104921576 A | 9/2015 | | |
| EP | 2835078 A1 | 2/2015 | | |
| GB | 2362188 A | 11/2001 | | |
| GB | 2365607 A | 2/2002 | | |
| WO | 2008097506 A2 | 8/2008 | | |
| WO | 2008145824 A1 | 12/2008 | | |
| WO | 2013169114 A1 | 11/2013 | | |
| WO | WO-2017178622 A1 * | 10/2017 | ........... | A47G 29/141 |

\* cited by examiner

ASSISTANCE SYSTEM FOR THE DELIVERY OF MAIL CONSIGNMENTS

CROSS-REFERENCE TO RELATED APPLICATIONS

This application is the national phase application under 35 U.S.C. § 371 claiming the benefit of priority based on International Patent Application No. PCT/EP2017/074537, filed on Sep. 27, 2017, which claims the benefit of priority based on European Patent Application No. 16191702.6, filed on Sep. 30, 2016. The contents of each of these applications are herein incorporated by reference.

FIELD OF THE INVENTION

The technology described herein generally relates to the delivery of mail items to buildings, for example by a mailman or an employee of another delivery service provider. Embodiments of the technology relate in particular to an assistance system for the delivery of mail items, a method for operating an assistance system of this kind, and a mailbox for an assistance system of this kind.

BACKGROUND OF THE INVENTION

In a building having a large number of tenants, mail items (e.g. letters, packages and parcels) are generally delivered to a central location inside or outside the building. Said location houses a mailbox system that is accessible for all the tenants and the deliverymen and comprises individual mailboxes or pigeon holes. The deliveryman deposits the mail items addressed to the individual tenants in said mailboxes, it being possible for one tenant to have a plurality of addressees (e.g. members of a family or of a company). Depending on the mailbox dimensions of a country, the deliveryman for example drops letters through a mailbox slot and deposits slightly larger mail items in an adjacent parcel box of the mailbox. Since the number of mailboxes generally corresponds to the number of tenants in the building, delivery in buildings having a large number of tenants is time consuming. If the mailbox system is arranged inside a building, the deliveryman may need a key in order to enter the building. This means that the deliveryman may need to carry with him keys for a plurality of buildings. A technology is therefore required that allows for more efficient and time-saving delivery of mail items.

SUMMARY OF THE INVENTION

An aspect of a technology of this kind relates to a mail delivery assistance system comprising a mailbox for receiving mail items, a data processing means, and a reader for recording mail item data of a mail item. The mailbox comprises an opening and an electronic locking mechanism which locks the opening in a closed state and releases said opening in an open state. The data processing means comprises a database having an address file in which one addressee is associated with one building address, respectively, at which the addressee is registered. When in operation, the data processing means is connected the reader for communication, and checks whether the recorded mail item data specify an addressee registered in the address file. If this is the case, the data processing means generates a control signal for the locking mechanism, in order to release the opening and allow for the mail item to be deposited in the mailbox.

Another aspect relates to a method for operating a mail delivery assistance system comprising a mailbox for receiving mail items, a data processing means having a database that comprises an address file in which one addressee is associated with one building address, respectively, and a reader for recording mail item data of a mail item. When a mail item addressed to an addressee is delivered to a building, mail item data of the mail item are recorded by the reader and the addressee of the mail item is determined on the basis of the mail item data. The data processing means checks whether the addressee of the mail item is associated, in the address file, with the building. If the addressee is associated, in the address file, with the building address of the building, a locking mechanism of the mailbox is activated in order to release an opening of the mailbox so that the mail item can be deposited in the mailbox.

An additional aspect relates to a mailbox for receiving mail items. The mailbox comprises an opening through which a mail item can be deposited in the mailbox, an electronic locking mechanism, and a reader for recording mail item data of the mail item. The locking mechanism can be actuated by a control signal that can be generated by a data processing means, locks the opening in a closed state, and releases said opening in an open state. When in operation, the reader can be connected to the data processing means for communication, in order to transmit the mail item data to the data processing means. The data processing means checks whether the mail item data match an addressee in an address file and, if this is the case, generates a control signal for the locking mechanism, in order to release the opening and allow for the mail item to be deposited in the mailbox.

In the present description of the technology, the term "mailbox" is used because it is generally used in connection with the delivery of physical mail items, in particular when the delivery is made at the address of the residence or place of business of an addressee. A person skilled in the art will recognize that a mailbox may be designed differently depending on the country and/or installation site. On a building, said mailbox may be fastened to an outer wall as a type of box, or may be arranged so as to be free-standing in front of the building. It is also possible, however, that only a closure, e.g. a slot or a flap, may be visible on a building, from the outside, while a container for receiving the mail item is arranged in the building wall or on an inner face of the building wall. The term "mailbox" and terminology associated therewith (e.g. to "post" a mail item) therefore should not be considered as being limiting to one specific embodiment of a container for receiving mail items.

The technology described herein supports a deliveryman on-site, i.e. at a building, while delivering mail items. A mail item may for example be a single letter, magazine or newspaper, a bundle of a plurality of letters, magazines or newspapers for one addressee or one tenant, a package or a parcel. For each mail item, a check is carried out as to whether said mail item is intended for a tenant or addressee registered in the building. Only when this is the case is deposition of the mail item in a mailbox permitted. Otherwise, the deliveryman may be advised that the tenant or the addressee is not registered or known in said building. The deliveryman deposits the mail items for all tenants of the building in one single mailbox rather than in a plurality of individual mailboxes. Said mailbox may for example be a central or communal mailbox for said building. The mail items deposited therein may be distributed within the building, or are available for collection by the tenants/addressees.

The technology allows for a flexible design of the assistance system in order to be able to adapt said system to desired requirements. In an embodiment, the reader is arranged in the building and is connected to the data processing means by a data line. The reader may for example be connected to the mailbox (e.g. as part of the mailbox) or be arranged apart from said mailbox, in or on the building, as a separate unit. If the reader is part of the mailbox, the installation of the mailbox is simplified because wiring between the mailbox and the reader is omitted.

In another embodiment, the reader is integrated in a mobile electronic device that the deliveryman carries with him. The electronic device can communicate with the data processing means via a radio link. The electronic device may be a mobile telephone, Smartphone or tablet PC for example. Said devices which are known per se are equipped with a digital camera and are adapted for applications according to the technology described herein; for example, a Smartphone is equipped with corresponding software.

Irrespective of whether the reader is part of the mailbox or integrated in a mobile electronic device, in an embodiment the reader comprises a digital camera that generates a digital image from an address field of a mail item. The digital image comprises the mail item data of the mail item. The electronic image is subsequently evaluated in order to identify the addressee of the mail item. The evaluation can be carried out using software for recognizing characters (e.g. optical character recognition (OCR) software) which is executed in the mobile electronic device or in the data processing means. In both cases, the evaluation then does not take place in the mailbox, and therefore the mailbox can be produced as a simpler unit which for example merely converts an electronic control signal into a mechanical action (i.e. unlocking the mailbox by means of an actuator, and possibly opening a closure). The mailbox can therefore be equipped with more or less (or lower) data processing capacity, depending on the application.

In order that an electronic device can automatically recognize characters by means of OCR software, the electronic device should be equipped with sufficient processing power. Higher processing power often also means greater complexity and greater power usage, which is critical in particular for mobile electronic devices. It may therefore be advantageous to evaluate the digital image in the data processing means which, as a stationary apparatus, has fewer demands with respect to complexity and power usage. In this case, the reader transmits the electronic image to the data processing means for evaluation.

The technology also allows for flexibility with respect to the arrangement of the data processing means. In one embodiment, the data processing means is arranged in the building, and in another embodiment said means is remote from the building. In both examples, the data processing means is connected to the reader via a data network (e.g. a data line). The data processing means may be part of a building management system that performs building-specific functions (e.g. building security, access control and person/tenant management). The address file stored in the data processing means comprises for example only the addressees registered in this building. These embodiments may be advantageous if a local or building-specific assistance system is to be created.

In a further embodiment, the data processing means communicates with the reader, when a mail item is delivered, via a communications network that comprises a radio network. The communications network may for example comprise the Internet. The address file of said data processing means stores for example the addressees of a plurality of buildings (e.g. in at least one town or at least one country). This embodiment may be advantageous if a global assistance system is to be created.

In this respect it should be noted that the terms "local" and "global" assistance system are used to explain embodiments by way of example. A person skilled in the art will recognize that the scope of the addressees stored in an address file can be selected according to the application.

In an embodiment of the assistance system, a location of the reader (deliveryman) or of the building is determined. For this purpose, in an embodiment the mobile electronic device is equipped with a module for position determination that uses the Global Positioning System, GPS. In another embodiment, the assistance system additionally comprises a building-side radio means that communicates with the mobile electronic device, e.g. emits a data signal that identifies the building or can be used to identify the building. In an embodiment, the radio means emits an identifier that is associated with a building, in a database. The mobile electronic device uses this identifier in order to access the database, e.g. the mobile electronic device transmits the identifier to a server that searches the database for this identifier and transmits the associated location data to the mobile electronic device. There is therefore also flexibility with respect to the determination of the location.

BRIEF DESCRIPTION OF THE DRAWINGS

Various aspects of the improved technology will be explained in the following with reference to embodiments and in conjunction with the figures. In the figures, the same elements are provided with the same reference signs. In the figures.

DETAILED DESCRIPTION OF EMBODIMENTS OF THE INVENTION

Figure 1:
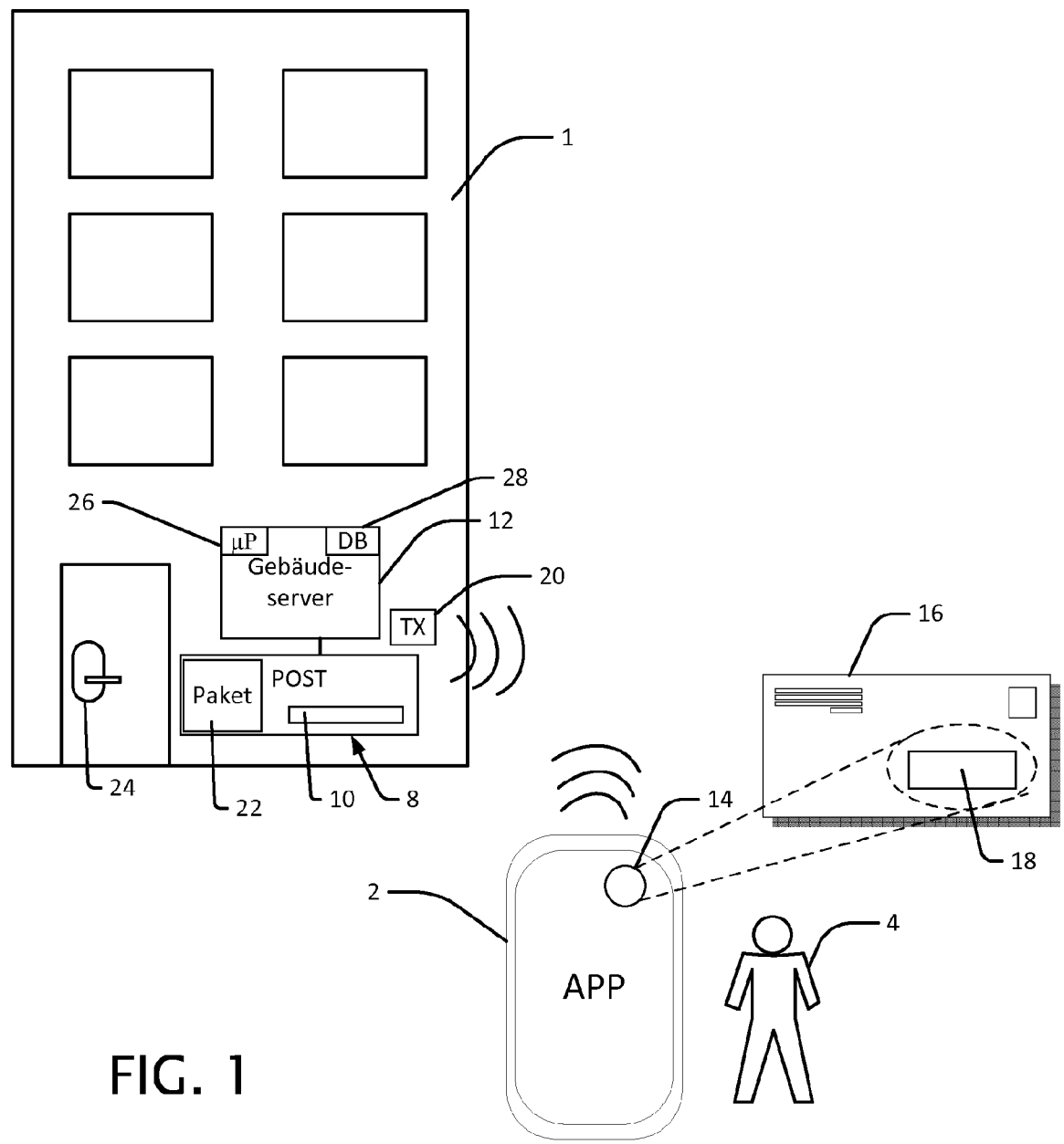
FIG. 1 is a schematic view of a first embodiment of an assistance system for the delivery of mail items.
Figure 2:
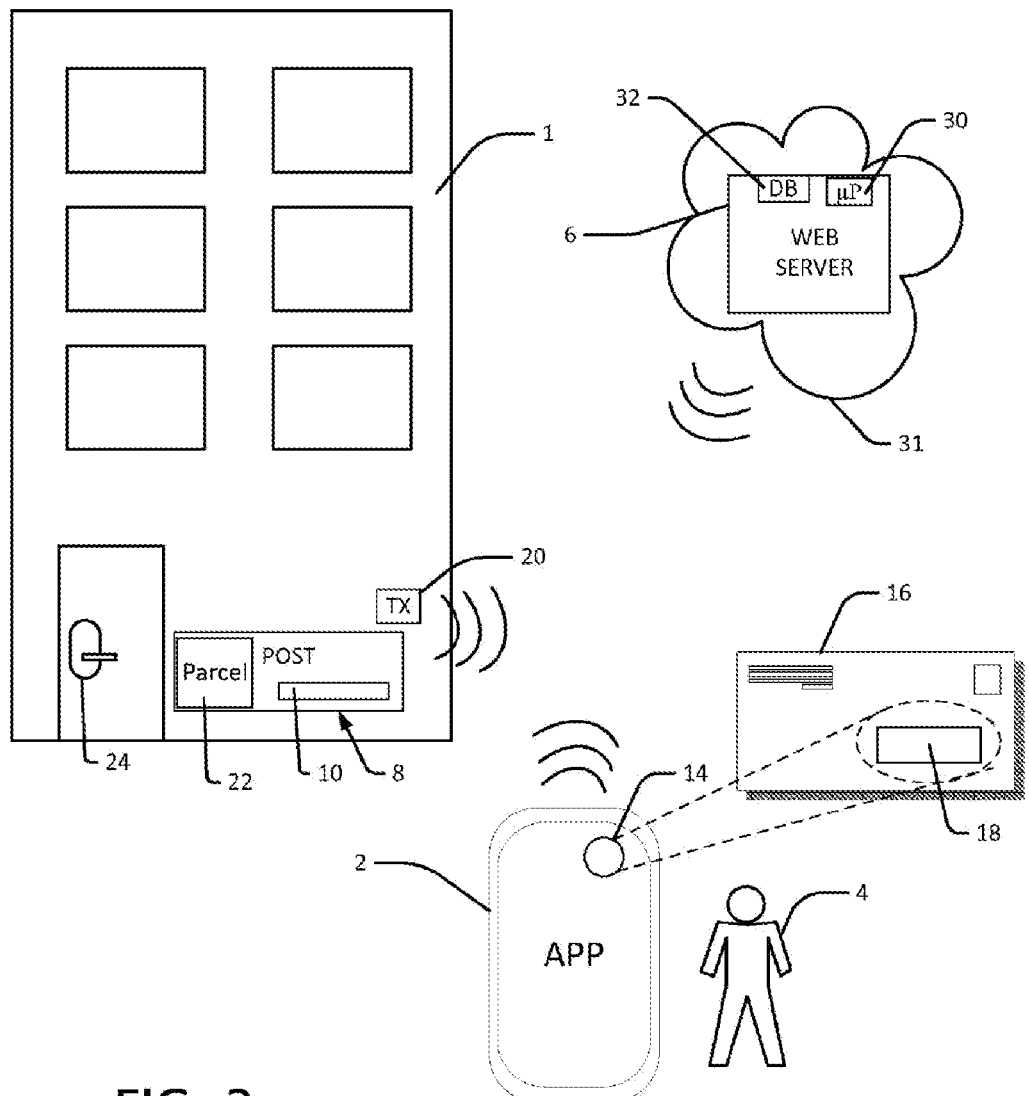
FIG. 2 is a schematic view of a second embodiment of an assistance system for the delivery of mail items.

FIG. 1 and FIG. 2 show two embodiments of an assistance system for the delivery of mail items 16 to a building 1 by a deliveryman 4. In the first embodiment shown in FIG. 1, the assistance system processes data locally, for example by means of a data processing unit 12 (also referred to in the following as a building server 12) that is arranged in the building 1. In the second embodiment shown in FIG. 2, the assistance system transmits data via a communications network 31 to a remote data processing unit 6 (also referred to in the following as a web server 6) in order to process the data there. In an embodiment, the communications network 31 allows for communication via the Internet and comprises a radio network and network elements provided therefor.

In both embodiments, the deliveryman 4 may be a mailman or an employee of another delivery service provider (e.g. a parcel and/or courier service). The deliveryman 4 is equipped with a reader 2 and is located in front of the building 1, in the situation shown in FIG. 1 and FIG. 2. The building 1 comprises a mailbox 8 having an opening 10 for posting mail items 16, the mailbox 8 being accessible from outside the building 1. However, said mailbox may also be accessible to the deliveryman 4 only from inside the building 1. In this case, the deliveryman can enter the building 1 through a building door 24 in order to reach the mailbox 8.

The opening 10 of the mailbox 8 can be closed by a closure 38 (see FIG. 5), e.g. a door, a screen, a flap, a shutter or the like. Depending on the embodiment, the opening 10 may be opened further or less far; for example, only a narrow slot may be released in order to post a letter. In the embodiment shown in FIG. 1 and FIG. 2, the mailbox 8 further comprises a parcel box 22 that can likewise be closed by a closure (e.g. door, shutter, or the like). In another embodiment, the parcel box 22 may be a unit separate from the mailbox 8, which is arranged at another location in the building 1 that is accessible to the deliveryman 4 (access may also be achieved e.g. via the building door 24), or outside the building 1.

In the embodiments shown in FIG. 1 and FIG. 2, the reader 2 carried by the deliveryman 4 comprises a camera 14, in particular a digital camera comprising CCD or CMOS image sensors which break down an (analog) image of an object (in this case the mail item 16) into image points (pixels) and convert color/brightness information into digital values (quantization). As a result, a dataset is generated, in accordance with a known file format (e.g. JPEG or TIFF), for each image. Said dataset is referred to here as a "digital image". The camera 14 or the reader 2 stores the digital image at least until the subsequent evaluation.

The embodiments described herein of the assistance system evaluate the digital image generated by the camera 14 using software for text recognition, in order to automatically recognize characters or text in a digital image. This type of text recognition is also known as optical character recognition (OCR). OCR software is offered for example by Nuance Communications, Inc. The recognized characters or the recognized text can be further processed in a processor unit. The text recognition can be performed in the reader 2 or in one of the data processing means 6, 12. In the latter case, the reader 2 transmits the digital image to the processor of the web server 32 in order for the optical character recognition to take place there.

The reader 2 may also comprise a radio module for near-field communication and/or a radio module for communication via the communications network 31. The near-field communication can take place e.g. according to a standard for Bluetooth, Wi-Fi/WLAN or RFID. In an embodiment, the communications network 31 comprises a mobile communications network, e.g. according to a standard for GSM, LTE or GPRP. It is possible for example to access the Internet via the communications network 31. A person skilled in the art will recognize that the radio modules are configured and programmed according to the selected communications standard.

In order to use the technology described herein, the reader 2 is equipped with corresponding application software or application-specific software (also referred to as an "app"), which can be operated via a graphical user interface (GUI). An aspect of said application software relates to the generation of the digital image of an address field 18 of the mail item 16, by means of which the mail item data are recorded. Another aspect of said application software relates to the communication of the reader 2 for example with the web server 6 and the mailbox 8. In an embodiment, the reader 2 is integrated in a mobile telephone or Smartphone comprising a camera 14 and associated application software. In the case of electronic devices of this kind, the Bluetooth function and the Wi-Fi function can be selectively activated.

In an embodiment, the assistance system checks whether the mail item 16 can be deposited in the mailbox 8 or, owing to the size thereof, is to be deposited in the parcel box 22. For this purpose, the reader 2 can be used alone or in conjunction with one of the data processing means 6, 12. For this purpose, the camera 14 of the reader 2 can be used, for example in conjunction with a 3D scanner software application, as a scanner. An application of this kind is described for example in a press release entitled "*Smartphone wird zum 3D*-Scanner" [Smartphone becomes 3*D scanner*] by ETH Zurich, dated May 12, 2013. Image processing software evaluates the 3D image using a pattern recognition method in order to decide whether the item is a letter or a parcel. In this case, the approximate size of the mail item 16 can also be determined. It is thus possible to decide where the mail item 16 is to be deposited. If the mail item 16 is to be deposited in the parcel box 22, the deliveryman 4 receives a corresponding notification. In an embodiment, the image processing also reveals the thickness of the mail item 16 and the extent to which the opening 10 is to be opened.

In the situations shown in FIG. 1 and FIG. 2, the technology described herein can be used advantageously when delivering a mail item 16 to the building 1. Summarized briefly and by way of example, the delivery takes place as follows: The deliveryman 4 is located in front of the building 1 and for example points the camera 14 at the address field 18 of the mail item 16. The camera 14 generates therefrom a digital image in order to record the mail item data. Depending on the embodiment, the mobile electronic device either evaluates the digital image or transmits the digital image to the data processing means for evaluation (depending on the embodiment, said data processing means is arranged in the web server 6 or in the building server 12), in order to identify the addressees of the mail item 16. The data processing means recognizes that the deliveryman 4 wishes to deliver the mail item 16 to the building 1, and checks whether the addressee is registered in said building 1. If this is the case, the opening 10 is unlocked and the deliveryman 4 can deposit (e.g. post) the mail item 16 in the mailbox 8. For this purpose, the data processing means may generate an electronic code or key and transmit said code or key to the reader 2, by means of which said reader can unlock the opening 10. If, in contrast, the addressee is not registered, the opening 10 remains closed. In this case, the deliveryman 4 can be notified that the mail item 16 cannot be delivered to the addressee in this building 1.

The assistance system recognizes the building 1 to which the deliveryman 4 wishes to deliver the mail item 16. One of various technologies can be used for this purpose. It is possible for the reader 2 to determine its position using a position determining system, for example the Global Positioning System, GPS, and thus also the location of the deliveryman 4. The assistance system uses the location of the deliveryman 4 and maps (e.g. country maps and/or city maps) in order to associate the location of said deliveryman with a building 1. Alternatively, a radio means 20 shown in FIG. 1 and FIG. 2, which radio means may be part of the mailbox 8 or may be arranged in or on the building 1 as a separate unit, can be used for position determining. The radio means 20 may be equipped for example for Bluetooth, Wi-Fi/WLAN or RFID technology.

Depending on the application, the radio means 20 may transmit and/or receive radio signals. In an embodiment, the radio means 20 comprises a radio module that is based on Bluetooth technology. The radio means 20 continuously transmits an individual identifier (e.g. "ID=5" that the reader 2 receives when it is in radio range. The reader 2 (or an installed software application) uses the received identifier in order for example to access a database by means of a radio link, in which database the identifier is linked to data relating to a building 1 (or a mailbox 8) on which the radio means 20 is arranged. The database stores for example a plurality of datasets, in each dataset a determined identifier being associated with a determined building (e.g. defined by house number, street, postcode and country).

In the embodiment according to FIG. 1, the data processing unit 12 is arranged in the building 1. The data processing unit 12 may also be remote from the building 1 (e.g. in a service or building management center) and be connected thereto for communication, in order to perform building-specific functions (e.g. relating to building security, access control and user management) for said building 1. In a case of this kind, the communication between the data processing means 12 and the various units and apparatuses in the building 1 (e.g. mailbox 8) takes place via a communications network, e.g. the Internet and/or a WAN.

As indicated in FIG. 1, in an embodiment the data processing unit 12 may be coupled to the mailbox 8 in order for example to control the opening and closing of the opening 10. In another embodiment, the data processing unit 12 may be coupled to the building door 24 in order to unlock said door if required, for example in order to allow the deliveryman 4 into the building 1 if the mailbox 8 is accessible only from inside the building 1. Depending on the embodiment, the data processing unit 12 may also be coupled to the radio means 20 in order to transmit data thereto and/or to receive data therefrom.

FIG. 1 furthermore shows that the data processing unit 12 comprises a processor unit 26 and a database 28. The database 28 stores the names of the tenants or the addressees registered in the building 1. The processor unit 26 is programmed to perform various functions and tasks of the data processing unit 12; for example said processor unit receives the mail item data (e.g. from the mailbox 8 according to FIG. 5 or from the radio means 20), accesses the data stored in the database 28, checks whether the database 28 contains a registered addressee for the mail item data, and controls the unlocking of the opening 10. In a manner corresponding thereto, FIG. 2 shows that the data processing unit 6 comprises a processor unit 30 and a database 32. Similarly to the processor unit 30, the processor unit 26 is programmed to perform various functions and tasks of the data processing unit 6; for example said processor unit receives the mail item data (e.g. from the reader 2), accesses the data stored in the database 32, checks whether the database 28 contains a registered addressee for the mail item data, and controls the unlocking of the opening 10.

A further embodiment of the assistance system results from a combination of the embodiments shown in FIG. 1 and FIG. 2. In this further embodiment, the assistance system comprises both a web server 6 (FIG. 2) and a building server 12 (FIG. 1). In an embodiment, the web server 6 and the building server 12 are coupled for communication, for example via the communications network 31. The web server 6 and the building server 12 can communicate with one another via said communications network 31.

Figure 3:
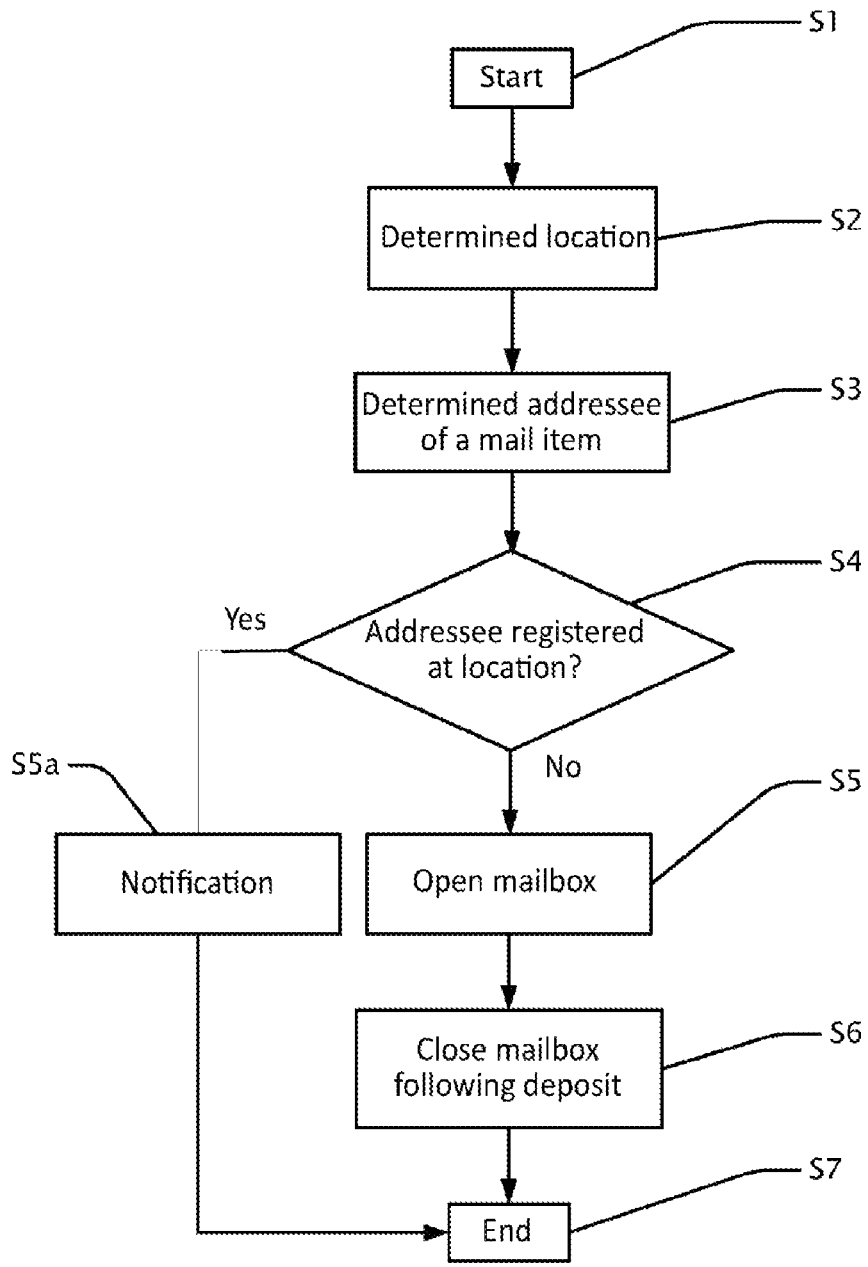
FIG. 3 is a flow diagram of an embodiment of a method for operating the assistance system.
Figure 4:
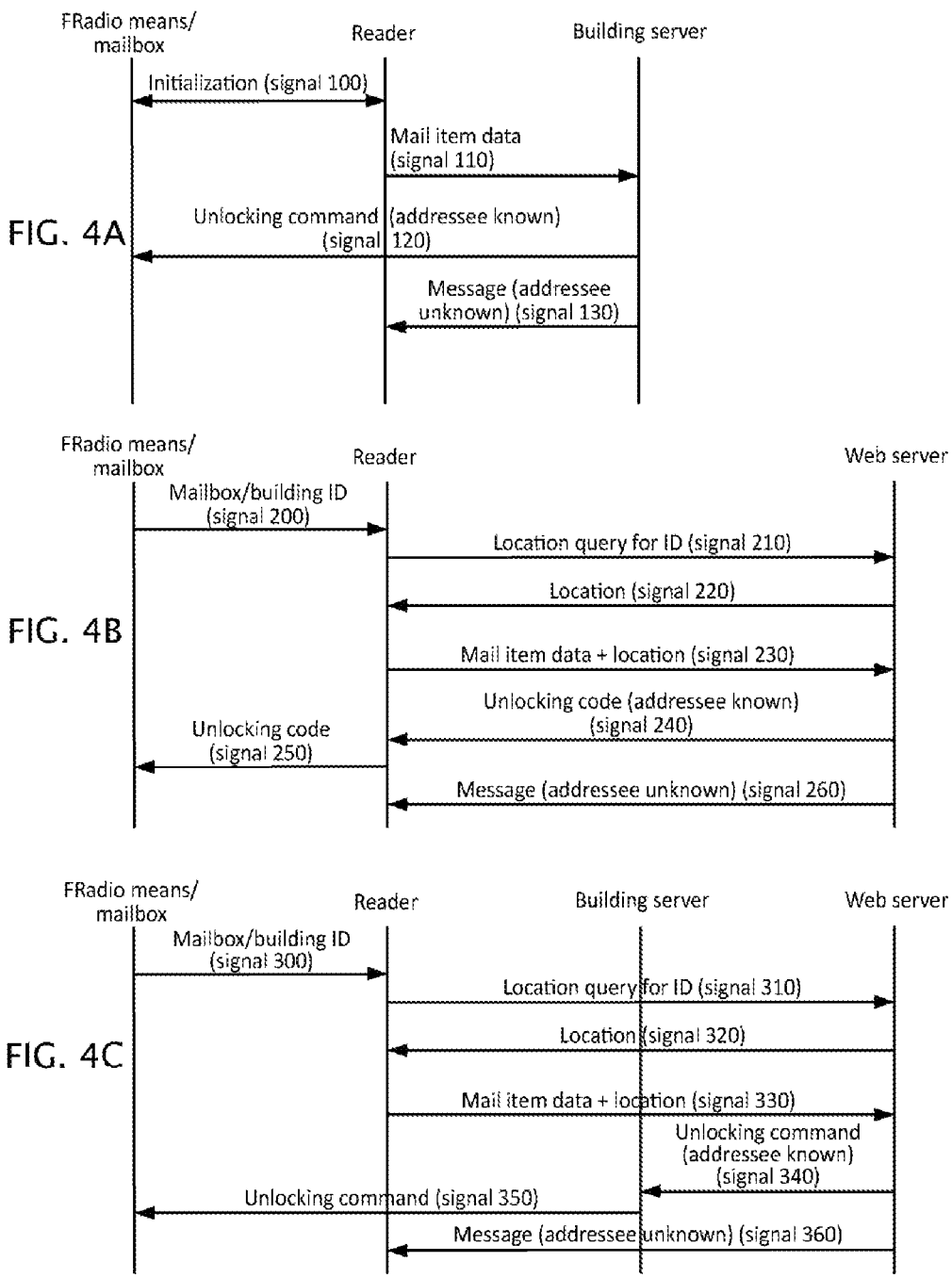
FIG. 4A is a signal diagram of an exchange of signals, by way of example, between a building server, a reader and a building or mailbox.
FIG. 4B is a signal diagram of an exchange of signals, by way of example, between a web server, a reader and a building or mailbox.
FIG. 4C is a signal diagram of an exchange of signals, by way of example, between a building server, a building server, reader and a building or mailbox.

A method, by way of example, for operating a mail delivery assistance system will be described in the following, with reference to FIG. 3, assuming understanding of the above-described fundamental system components and the functionalities thereof. The description is provided with reference to a situation shown in FIG. 1 and FIG. 2, in which the deliveryman 4 is located in front of the building 1 and wishes to deliver a mail item 16. In this case, the deliveryman 4, holding the reader 2, is within radio range of the radio means 20, i.e. the radio signal emitted by the radio means 20 has a signal strength (expressed by an RSSI value (received signal strength indicator)) at the location of the deliveryman 4 or of the reader 2 (point of reception) that is greater than an RSSI threshold value specified for reliable reception. The deliveryman 4 has already activated the functions for radio communication (e.g. Bluetooth is activated on the reader 2) and the software application provided for the delivery. The method begins in a step S1 and ends in a step S7.

The location of the deliveryman 4 is determined in a step S2. This can take place as described above, using GPS or the radio means 20. Location data that reveal for example that the deliveryman 4 is located in front of the building 1 having a determined house number in a determined street in a determined town are provided as the result of said location determination. The location data may comprise one, a plurality or all of these items of information. The location determination is carried out automatically and without any action by the deliveryman 4; in one embodiment, said determination is carried out automatically by means of the software application of the reader 2.

An addressee of the mail item 16 is determined in a step S3. For this purpose, the deliveryman 4 positions the mail item 16 and the reader 2 such that the camera 14 can generate a digital image from the address field 18 of the mail item 16. OCR software evaluates the digital image in order that the mail item data can be further processed electronically. At the end of said processing, information relating to the addressee of the mail item 16 is provided. The information comprises the addressee (name of the person/tenant to whom the mail item 16 is addressed).

Depending on the embodiment, said information may also comprise the entire address including the name, street, house number, place and country.

With regard to steps S2 and S3, it should be noted that said steps can be carried out in any sequence, including simultaneously.

In a step S4, a check is made as to whether the addressee determined in step S3 is registered at the location of the deliveryman 4 determined in step S2, and thus of the building 1. For this purpose, the data processing means 6, 12 check whether the addressee is associated, in the database 28, 32 assigned thereto, with the building 1 defined by the location data. If this is the case, the addressee is registered in said building 1 and the method continues along a "yes" branch to a step S5. In an embodiment, the data processing means 6, 12 receives the location data and the mail item data. A person skilled in the art will recognize that, depending on the embodiment of the assistance system, the mail item data may also comprise the location data.

However, if the addressee is not registered in said building 1, the method continues along a "no" branch to a step S5*a*. In step S5*a*, the deliveryman 4 is notified of this. The notification may take place by means of a text message, an acoustic signal (e.g. an acoustic warning or error signal) and/or a visual signal (e.g. by activating a colored (e.g. red) LED). Depending on the embodiment, the text message may be shown on a display of the reader 2 or of the mailbox 8. The acoustic and/or visual signals may also be generated by the reader 2 or by apparatuses on the mailbox 8. A notification may also be achieved by means of the mailbox 8 remaining locked and depositing of the mail item 16 not being permitted.

In an embodiment, the notification shown on the display of the reader 2 or of the mailbox 8 informs the deliveryman 4 that the address could not be recognized. For example, the address may be partially or entirely illegible owing to dirt, smudged ink or because it is hand-written. In this case, the deliveryman 4 may be required to input the address manually, e.g. on the mobile device 2. Depending on the embodiment, the deliveryman 4 may type in the address, or the mobile device 2 shows possible and known addresses from which the deliveryman 4 can select an address. Said addresses may be listed in a suggestion list through which the deliveryman 4 can browse (scroll). Following said manual input, the check can be carried out in step S4.

After the addressee has been recognized, in step S4, as registered in the building 1, the mailbox 8 is unlocked and opened in step S5 so that the deliveryman 4 can deposit the mail item 16 in the mailbox 8. In the embodiment shown in FIG. 1, the data processing means 12 can generate a control signal that activates a locking mechanism 34, 36, 38 (see FIG. 5) of the mailbox 8, which thereupon releases the opening 10 so that the deliveryman 4 can deposit the mail item 16. In an embodiment, the opening 10 remains released until the mail item 16 is deposited. For this purpose, a light barrier 54 (see FIG. 5) may be arranged on the opening 10, such that a hand of the deliveryman 4 and/or the mail item 16 first break and then re-release the light path during the depositing process. In another embodiment, the opening 10 is released for a fixed time period (e.g. for a few seconds), so that the deliveryman 4 can deposit the mail item 16. After the fixed time period has expired, the mailbox 8 is locked again.

In another embodiment, the locking mechanism 34, 36, 38 may contain a radio module that is used for receiving a (radio) control signal (e.g. an electronic code or key) from the reader 2 or web server 6. As described elsewhere, the locking mechanism 34, 36, 38 may adjust for example the width of a slot on the basis of the size or thickness of the mail item 16.

If the deliveryman 4 has deposited the mail item 16, the mailbox is closed and locked again in a step S6, and the method ends in step S7. In an embodiment, the locking takes place automatically as soon as the light path is free again or after the fixed time period has expired. As a result, the mailbox 8 is unlocked and opened only in order to deposit a mail item 16 that is addressed to an addressee registered in the building 1; the risk of incorrect depositing of a mail item 16 (e.g. an addressee does not live in the building 1) and the possibility of depositing unaddressed mail items (e.g. advertising/mailshots) are reduced. Furthermore, depositing of rubbish, inter alia on account of vandalism, is prevented.

In an embodiment, the addressee can be notified that a mail item 16 has been deposited for him. This notification may be a text message for example (e.g. SMS, email) which is sent to a telephone number or email address that is stored for this purpose.

FIG. 4A, FIG. 4B, FIG. 4C, FIG. 5A and FIG. 5B show various embodiments of methods for operating the mail delivery assistance system, on the basis of signal diagrams. Said diagrams show the signal exchange between individual units/components of the assistance system which are involved in carrying out a method. For illustration purposes, the mailbox 8 and the radio means 20 are not shown as separate signal receivers or signal transmitters. A person skilled in the art will recognize that the radio means 20 can be interpreted as being part of the mailbox 8 or as being separate therefrom and part of the building 1.

FIG. 4A is a signal diagram of an exchange of signals, by way of example, between the building server 12, the reader 2 and the mailbox 8 or the radio means 20. The signal exchange shown may take place in the assistance system shown in FIG. 1 for example. If the deliveryman 4, and thus the reader 2, comes within radio range of the radio means 20, a radio link between the reader 2 and the radio means 20 is initialized (signal 100). The initialization may for example activate the building server 12 and in some circumstances identify the building 1 to the reader 2. This may function as a confirmation for the deliveryman 4 that he is also actually outside the desired building 1. If the reader 2 has generated a digital image of the address field 18, said reader transmits the digital image, comprising the mail item data of the mail item 16, to the building server 12 (signal 110). If the building server 12 ascertains, following evaluation of the digital image by means of the OCR software, that the addressee of the mail item 16 is registered or known in the building 1, said server transmits, to the mailbox 8, a control signal that corresponds to an unlocking command (signal 120). The mailbox 8 is thereupon unlocked and opened, and the deliveryman 4 can deposit the mail item 16 in the mailbox 8. If, in contrast, the addressee is not registered or is unknown in the building 1, the deliveryman 4 is informed thereof; for example, the building server 12 transmits a message to the reader 2 (signal 130).

FIG. 4B is a signal diagram of an exchange of signals, by way of example, between the web server 6, the reader 2 and the mailbox 8 or the radio means 20. The signal exchange shown may take place in the assistance system shown in FIG. 2 for example. If the deliveryman 4, and thus the reader 2, comes within radio range of the radio means 20 which transmits an individual identifier (ID) for example on the basis of Bluetooth technology, said reader receives the identifier of the mailbox 8 or of the building 1 (signal 200). The mobile electronic device 2 transmits a location query to the web server 6 which thereupon identifies the location of the building 1 or mailbox 8 that is registered to said identifier (signal 210). The building server 12 transmits to the reader 2 the location data associated with the identified location (signal 220). If the reader 2 has generated a digital image of the address field 18 comprising the mail item data, said reader transmits said digital image, together with the location data, to the web server 6 (signal 230). If the web server 6 ascertains, following evaluation of the digital image by means of the OCR software, that the addressee of the mail item 16 is registered or known in the building 1, said server generates an unlocking code (electronic key) and transmits said code to the reader 2 (signal 240). The reader 2 transmits the unlocking code to the mailbox 8 (signal 250). If the unlocking code is recognized as being valid for the mailbox 8, the mail item 8 is unlocked and opened, and the deliveryman 4 can deposit the mail item 16 in the mailbox 8. If, in contrast, the addressee is not registered or is unknown in the building 1, the deliveryman 4 is informed thereof; for example, the web server 6 transmits a message to the reader 2 (signal 260).

FIG. 4C is a signal diagram of an exchange of signals, by way of example, between the web server 6, the building server 12, the reader 2 and the mailbox 8 or the radio means 20. The signal exchange shown can take place for example in an assistance system which results from a combination of the embodiments shown in FIG. 1 and FIG. 2. In order to avoid repetitions, only the differences from the signal curve shown in FIG. 4B will be discussed here. The signals 300-330 and 360 shown in FIG. 4C correspond to the signals 200-230 and 260 shown in FIG. 4B. If the web server 6 receives the mail item data and location data (signal 230) transmitted by the reader 2, the web server 6 checks whether the addressee of the mail item 16 is registered or known in the building 1. If this is the case, said web server transmits an unlocking command to the building server 12 (signal 340). The building server 12 actuates the mailbox 8 in accordance with the unlocking command (signal 350). The mailbox 8 is thereupon unlocked and opened, and the deliveryman 4 can deposit the mail item 16 in the mailbox 8.

A person skilled in the art will recognize that the signal exchange shown in FIG. 4C may also be modified in another embodiment of the assistance system. In this embodiment, the web server 6 transmits the unlocking command directly to the mailbox 8. For this purpose, the mailbox 8 comprises a communication means in order to be able to receive the unlocking command. The communication means may comprise a processor unit or be coupled to such a unit in order to generate a control signal for the locking mechanism of the mailbox 8 from the unlocking command.

A person skilled in the art will also recognize that the location does not necessarily need to be determined from an identifier received by the reader 2 or on the basis of communication between the building-side radio means 20 and the reader 2. As mentioned elsewhere in this description, GPS technology may also be used for determining the location. Furthermore, a person skilled in the art will recognize that the evaluation of the digital image using the OCR can also take place in the reader 2.

Figure 5:
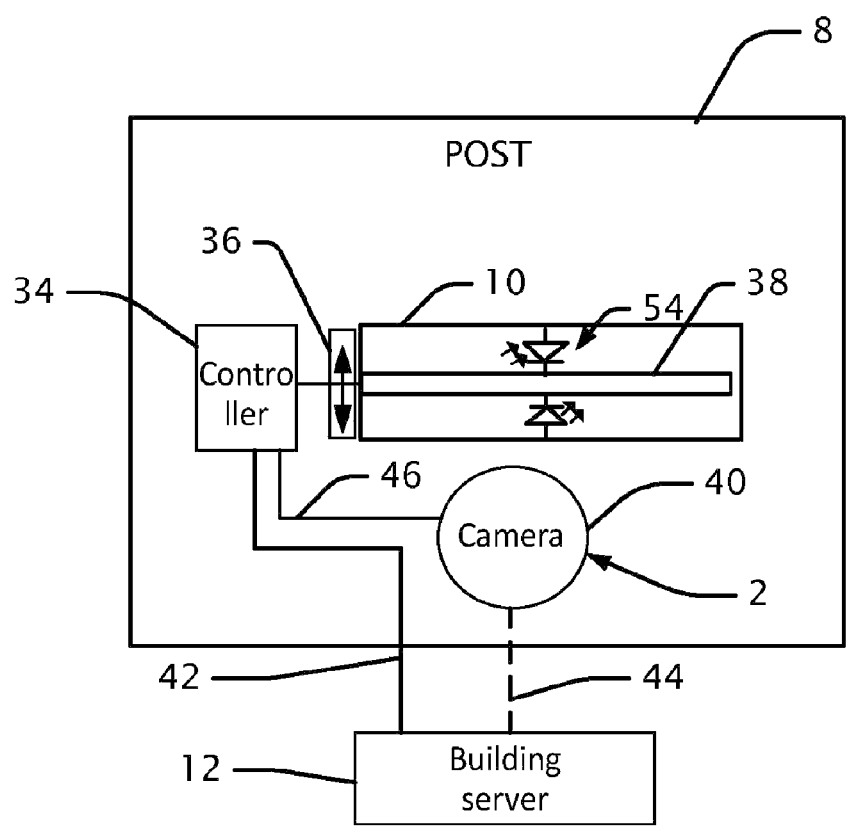
FIG. 5 is a schematic view of a mailbox for embodiments using and not using a reader.

FIG. 5 is a schematic view of an embodiment of a mailbox 8 as can be used in various embodiments of the assistance system. This figure shows the components that appear to be helpful for understanding the technology described herein. Although a container for receiving deposited mail items 16 is not shown in FIG. 5, a person skilled in the art will recognize that deposited mail items 16 are collected in a container and are available therein for further distribution within the building or for collection. FIG. 5 furthermore shows the coupling of the mailbox 8 to the building server 14 by means of a data network 42. The data network 42 can be configured for wired and/or wireless communication.

In addition to the opening 10, the components shown in FIG. 5 also include a controller 34, and actuator 36, a closure 38 and the light barrier 54. The light barrier 54 is coupled to the controller 34 and has the function that is described elsewhere. As an alternative to the light barrier 54, a proximity sensor may be used, e.g. based on ultrasound or capacitive changes. In an embodiment, the controller 34, the actuator 36 and the closure 38 form a locking mechanism which unlocks the closure 38 and releases the opening 10, in response to a control signal of the building server 12, so that a mail item 16 can be deposited. In an embodiment, the actuator 36 is an electronic lock comprising a relay and a bolt, the relay releasing the bolt, and thus the closure 38, in response to a control signal of the controller 34. The deliveryman 4 can then manually open the closure 38 for example. In another embodiment, the closure 38 can be moved by the actuator 36. For this purpose, the actuator 38 may comprise a stepper motor for example, which motor acts on the closure 38 and moves said closure form a closed and locked state into an open state. If the closure 38 is designed for example as a flap, door, screen or shutter, the actuator 38 can open the closure 38 to a greater or lesser extent and thus release a larger or smaller opening; a shutter can for example be raised as required in order for example to release an opening in the form of a slot. In this case, the opening 10 is opened only as far as is necessary.

In the embodiments described above, the reader 2 records the mail item data of the mail item 16. In a further embodiment of an assistance system, the function of recording the mail item data is performed on the building side at least in part. For this purpose, the mailbox 8 shown in FIG. 5 is additionally equipped with a camera 40 in order to generate a digital image of the address field 18. The digital image is evaluated using OCR software in the building server 12 or on another component of the mailbox 8, e.g. the controller 34. The camera 40 is coupled to the building server 12 by means of a data network 44 (e.g. a data line).

In order that the camera 40 is triggered only when the deliveryman 4 wishes to deliver the mail item 16 and is not triggered continuously or in error by people passing by, the assistance system recognizes that the deliveryman 4 is close to the mailbox 8. The radio means 20, for example, can be used for this purpose, which radio means communicates with the reader 2, with the result that the deliveryman 4 is identified as such. In another embodiment, the mailbox 8 comprises a proximity sensor, e.g. an ultrasound sensor, which detects the presence of the deliveryman 4. The proximity sensor may be arranged for example in the vicinity of the camera 40, such that said sensor detects the proximity of a hand or the mail item 16 when said hand or item is close to the camera 40.

Figure 6A:
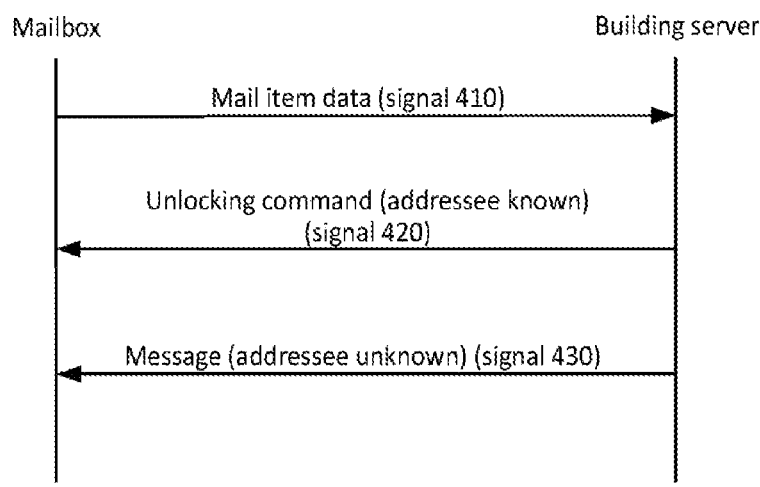
FIG. 6A is a signal diagram of an exchange of signals, by way of example, between a building server and a building or mailbox.
Figure 6B:
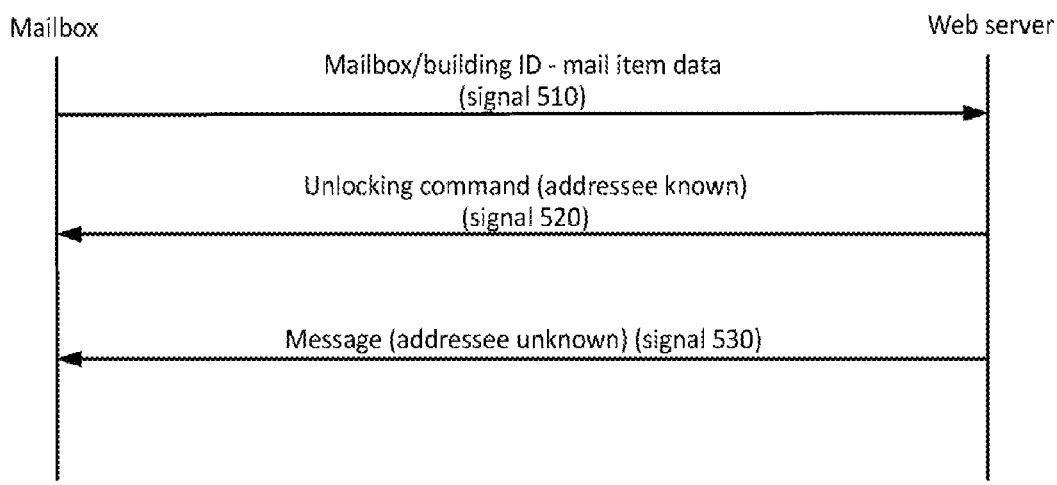
FIG. 6B is a signal diagram of an exchange of signals, by way of example, between a web server and a building or mailbox.

The use of the camera 40 shown in FIG. 5 in a further embodiment of an assistance system is described in connection with FIG. 6A and FIG. 6B. FIG. 6A is a signal diagram of an exchange of signals, by way of example, between the building server 12 and the mailbox 8. In said assistance system, the deliveryman 4 positions the mail item 16 in front of the camera 40, which camera is triggered when a proximity sensor detects the presence of a person or when the presence of the deliveryman 4 is detected, as described above.

The digital image generated by the camera 40 is evaluated by the OCR software in the building server 12. For this purpose, the mailbox 8 or one of the components thereof transmits the digital image, comprising the mail item data, to the building server 12 (signal 410). In this case, it should be noted that no location data are transmitted to the building server 12 because the location of the mailbox 8 is known; said server is for example arranged in the same building 1, together with the mailbox 8, or is connected to the building 1 for communication, in order to perform building-specific functions for the building 1.

If, in an embodiment, a proximity sensor is used, it is possible to recognize, at this time, whether a mail item 16 has actually been held in front of the camera 40 or whether, in misuse, this was another object. If the OCR software for example does not recognize any text characters in the digital image, the digital image is deleted. The digital image is also deleted if the OCR software recognizes text characters but said characters do not correspond to the typical format of a mailing address. Depending on the embodiment of the mailbox 8 or of the assistance system, in the latter case an error or warning signal may be generated, which signal alerts the deliveryman 4 thereto.

The building server 12 checks whether the addressee is associated, in the database 28 assigned thereto, with the building 1. If this is the case, the addressee is registered in said building 1 and the building server 12 generates a control signal that corresponds to an unlocking command, and transmits said signal to the mailbox 8 (signal 420). The mailbox 8 is thereupon unlocked and opened, and the deliveryman 4 can deposit the mail item 16 in the mailbox 8. If, in contrast, the addressee is not registered or is unknown in the building 1, the deliveryman 4 is informed thereof; for example, the building server 12 transmits a control signal to the mailbox 2 (signal 430) in order to signal an error or a warning to the deliveryman 4 by means of a visual or acoustic signal.

In another embodiment, the mailbox 8 does not communicate with the building server 12, but instead with the web server 6. In this respect, FIG. 6B is a signal diagram of an exchange of signals, by way of example, between the web server 12 and the mailbox 8. The mail item data, including the addressee of the mail item 16, are identified for example as described in connection with FIG. 6A. In addition thereto, the mailbox 8 transmits the identifier thereof or that of the building 1 to the web server 6 (signal 510). The web server 6 can thus identify the location of the mailbox 8 or of the building 1. The web server 6 checks whether the addressee is associated, in the database 32 assigned thereto, with the building 1 and, in a manner similar to that shown in FIG. 6A, transmits a control signal (signal 520) or an error/warning signal to the mailbox 8.

In the above description of the technology, in connection with FIG. 1-FIG. 6B, the reader 2 comprises the camera 14. This is advantageous in that the mail items 16 can be provided with an address in a conventional manner, without the need for additional processing of the mail items 16 (e.g. by applying a code marking). Furthermore, the address can also be read, as before, by the deliveryman 4. This may be useful in the event of the deliveryman 4 possibly needing to input the address manually. If the address is provided on the mail item 16 in addition or exclusively in coded form, e.g. as a visual bar code, the camera 14 can be used as a scanner. An associated software application then evaluates the scanned code in order to identify data of the mail item 16, in particular the address.

A mail item 16 may also be equipped with an electronic label, on which mail item data are stored by means of a memory chip and can be read out by a reader provided for this purpose. The mail item data may also comprise information regarding the type (e.g. single letter, magazine, parcel or bundle of letters) of the mail item 16 and the size or volume thereof The electronic label may be a radio tag that is based on RFID technology for example. The mail item data are stored on a chip. In order to be able to read out the mail item data from a label of this kind, the reader 2 is equipped with an RFID reader.

The embodiments described herein make use of communication means and communications network which are configured for operation in accordance with various technologies. It is possible, for example, to use single network protocols or a plurality of network protocols (e.g. ethernet, ATM). It is also possible to use single radio network technologies or a plurality of radio network technologies, for example ZigBee according to the norm IEEE 802.15.4, Wireless Local Area Network (WLAN) according to the norm IEEE802.11, Worldwide Interoperability for Microwave Access (WIMAX) according to the norm IEEE802.16, having a range of from several 100 meters to several tens of kilometers. The radio frequency used by the radio network is for example in the 2.4 GHz band or in the 5.0 GHz band in the case of WLAN, and is in the 10 to 66 GHz band in the case of WIMAX.

The invention claimed is:

1. A method for assisting with delivery of mail items to a mailbox associated with an addressee, utilizing a central server having a data processor and a database of addressee information containing associated mailboxes and a portable reader device utilized by a person delivering the mail items, the method comprising:

utilizing the portable reader device to obtain location information corresponding to a vicinity of the mailbox the delivery person is near and to scan a mail item to obtain addressee information from the mail item;

transmitting the location information and the obtained addressee information from the portable reader device to the central server;

at the central server, utilizing the received location information and the addressee information database to check the obtained addressee information to determine whether the addressee is associated with a mailbox in the vicinity of the location information obtained by the portable reader and transmitted to the central server, and when the addressee is associated with a mailbox in the vicinity, the central server operating to transmit an unlock signal which operates to unlock the specified addressee's mailbox to allow the delivery person to deliver the mail item into the unlocked mailbox, and when the addressee is not associated with the mailbox in the vicinity, the central server operating to transmit a message which operates to inform the delivery person that the addressee is unknown for the location information.

2. The method of claim 1, wherein the unlock signal is transmitted from the central server to the portable reader device to allow the delivery person to unlock the associated mailbox under direct control of the delivery person.

3. The method of claim 1, wherein the unlock signal is transmitted from the central server directly to the associated mailbox to cause the associated mailbox to be unlocked under direct control of the central server.

4. The method of claim 1, wherein the mailbox is located within or adjacent a building, and the step of obtaining location information further comprises:

utilizing the portable reader device to obtain an identifier of the building;

determining the location information based on the obtained identifier of the building; and transmitting the location information to the portable reader device.

5. The method of claim 4, wherein the obtained identifier of the building is transmitted by the portable reader device to the central server, and the central server utilizes the received identifier to determine the location of the building.

6. The method of claim 1, wherein the step of obtaining location information utilizes a global positioning system or an RFID beacon.

7. The method of claim 1, further comprising the steps of:

generating an image of an address located on the mail item utilizing a camera of the portable reader device; and evaluating the address image using character recognition to determine an addressee of the mail item, wherein the evaluating is carried out by the portable reader device or the central server.

8. The method of claim 1, wherein the location information and the obtained addressee information are transmitted from the portable reader device to the central server together in a single signal transmission.

9. A mail delivery assistance system operable to assist a delivery person in the delivery of mail items or packages, comprising:
   a mailbox associated with an addressee and operable to receive mail items, the mailbox including an opening and an electronic locking mechanism, wherein the electronic locking mechanism is operable to lock and unlock the opening;
   a portable reader device operated by the delivery person and operable to obtain location information corresponding to a vicinity of the mailbox the delivery person is near and to scan a mail item to obtain addressee information from the mail item, and further to transmit the location information and the obtained addressee information from the portable reader device to the central server;
   a central server including a database of addressee information and associated location information, operable to utilize the received location information and the addressee information database to check the obtained addressee information to determine whether the addressee is associated with a mailbox in the vicinity of the location information obtained by the portable reader and transmitted to the central server, and when the addressee is associated with a mailbox in the vicinity, the central server is further operable to transmit an unlock signal which operates to unlock the specified addressee's mailbox to allow the delivery person to deliver the mail item into the unlocked mailbox, and when the addressee is not associated with the mailbox in the vicinity, the central server operating to transmit a message which operates to inform the delivery person that the addressee is unknown for the location information.

10. The system of claim 9, wherein the unlock signal is transmitted from the central server to the portable reader device to allow the delivery person to unlock the associated mailbox under direct control of the delivery person.

11. The system of claim 9, wherein the unlock signal is transmitted from the central server directly to the associated mailbox to cause the associated mailbox to be unlocked under direct control of the central server.

12. The system of claim 9, wherein the mailbox is located within or adjacent a building, wherein the portable reader device is further operable to obtain an identifier of the building, determine the location information based on the obtained identifier of the building, and transmit the location information to the portable reader device.

13. The system of claim 12, wherein the obtained identifier of the building is transmitted by the portable reader device to the central server, and the central server utilizes the received identifier to determine the location of the building.

14. The system of claim 9, wherein the step of obtaining location information utilizes a global positioning system or an RFID beacon.

15. The system of claim 9, wherein the portable reader device includes a camera operable to generate an image of an address located on the mail item, the system further operable to evaluate the address image using character recognition to determine an addressee of the mail item, wherein the evaluating is carried out by the portable reader device or the central server.

16. The system of claim 9, wherein the location information and the obtained addressee information are transmitted from the portable reader device to the central server together in a single signal transmission.

17. A mailbox associated with an addressee and operable to receive mail items, comprising:
   an opening through which a mail item can be deposited in the mailbox;
   an electronic locking mechanism which locks the opening in a closed state and releases said opening in an open state, and which can be actuated by means of a control signal received from a central server, wherein a portable reader device is operable by a delivery person to obtain location information corresponding to a vicinity of the mailbox the delivery person is near and to scan a mail item to obtain addressee information from the mail item, and further to transmit the location information and the obtained addressee information from the portable reader device to the central server, wherein the central server includes a database of addressee information and associated location information, the central server is operable to utilize the received location information and the addressee information database to check the obtained addressee information to determine whether the addressee is associated with a mailbox in the vicinity of the location information obtained by the portable reader and transmitted to the central server, and when the addressee is associated with a mailbox in the vicinity, the central server is further operable to transmit an unlock signal which operates to unlock the specified addressee's mailbox to allow the delivery person to deliver the mail item into the unlocked mailbox, and when the addressee is not associated with the mailbox in the vicinity, the central server operating to transmit a message which operates to inform the delivery person that the addressee is unknown for the location information.

18. The mailbox of claim 17, wherein the unlock signal is transmitted from the central server to the portable reader device to allow the delivery person to unlock the associated mailbox under direct control of the delivery person.

19. The mailbox of claim 17, wherein the unlock signal is transmitted from the central server directly to the associated mailbox to cause the associated mailbox to be unlocked under direct control of the central server.

20. The mailbox of claim 17, wherein the mailbox is located within or adjacent a building, wherein the portable reader device is further operable to obtain an identifier of the building, determine the location information based on the obtained identifier of the building, and transmit the location information to the portable reader device.

21. The mailbox of claim 20, wherein the obtained identifier of the building is transmitted by the portable reader device to the central server, and the central server utilizes the received identifier to determine the location of the building.

22. The mailbox of claim 17, wherein the step of obtaining location information utilizes a global positioning system or an RFID beacon.

23. The mailbox of claim 17, wherein the portable reader device includes a camera operable to generate an image of an address located on the mail item, the system further operable to evaluate the address image using character recognition to determine an addressee of the mail item, wherein the evaluating is carried out by the portable reader device or the central server.

24. The mailbox of claim 17, wherein the location information and the obtained addressee information are transmitted from the portable reader device to the central server together in a single signal transmission.

\* \* \* \* \*